US010783384B2

(12) United States Patent
Auner

(10) Patent No.: US 10,783,384 B2
(45) Date of Patent: Sep. 22, 2020

(54) OBJECT DETECTION USING SHADOWS

(71) Applicant: Toyota Motor Engineering & Manufacturing North America, Inc., Plano, TX (US)

(72) Inventor: David B. Auner, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 77 days.

(21) Appl. No.: 16/050,377

(22) Filed: Jul. 31, 2018

(65) Prior Publication Data

US 2020/0042801 A1 Feb. 6, 2020

(51) Int. Cl.
*G06K 9/00* (2006.01)
*G06K 9/46* (2006.01)
*B60W 30/09* (2012.01)
*G06T 7/73* (2017.01)

(52) U.S. Cl.
CPC ......... *G06K 9/00805* (2013.01); *B60W 30/09* (2013.01); *G06K 9/4604* (2013.01); *G06T 7/73* (2017.01); *B60W 2420/403* (2013.01); *B60W 2420/42* (2013.01); *B60W 2420/52* (2013.01); *B60W 2420/54* (2013.01); *B60W 2554/00* (2020.02); *B60W 2720/24* (2013.01); *G06T 2207/30252* (2013.01)

(58) Field of Classification Search
CPC .... B60R 2300/8066; B60R 2300/8093; G06K 9/00805; G06K 9/4606
See application file for complete search history.

(56) References Cited

U.S. PATENT DOCUMENTS

| 6,741,202 | B1 | 5/2004 | Krikorian et al. |
| 7,205,927 | B2 | 4/2007 | Krikorian et al. |
| 2012/0136510 | A1* | 5/2012 | Min ........................ G01S 17/88 701/2 |
| 2012/0200539 | A1* | 8/2012 | Sato ........................ G06F 3/042 345/175 |
| 2017/0108876 | A1* | 4/2017 | Mullan .................. G05D 1/104 |
| 2017/0356993 | A1* | 12/2017 | Lee ........................ G01S 13/865 |

FOREIGN PATENT DOCUMENTS

CN 105023254 A 11/2015

* cited by examiner

*Primary Examiner* — John J Lee
(74) *Attorney, Agent, or Firm* — Christopher G. Darrow; Darrow Mustafa PC

(57) ABSTRACT

Some objects in an external environment of a vehicle may be difficult to detect by a human driver or by vehicle sensors. Such object may be indirectly detected using information in the external environment of the vehicle. Sensor data of the external environment of the vehicle can be acquired using one or more sensors, which can be located onboard the vehicle. An external transmitter or transmission can be detected based on the acquired sensor data. The acquired sensor data can also be used to identify the external transmitter or transmission. A shadow can be detected in the acquired sensor data. An object in the external environment can be detected using at least in part the detected shadow. In some instances, a characteristic associated with the identified external transmitter or transmission can also be used to detect the object and/or one or more characteristics of the object.

26 Claims, 5 Drawing Sheets

OBJECT DETECTION USING SHADOWS

FIELD

The subject matter described herein relates in general to vehicles and, more particularly, to the detection of objects in the external environment of a vehicle.

BACKGROUND

Some vehicles are equipped with sensors that can acquire information about the surrounding environment. Such information can be used for various purposes, such as detecting the presence of objects in the environment. In some instances, information acquired by the sensors can be used by a human driver in deciding how to operate the vehicle. Alternatively, a vehicle computing system can use the information to determine how to navigate and/or maneuver the vehicle through the surrounding environment.

SUMMARY

In one respect, the subject matter presented herein relates to a method of detecting objects in an external environment of a vehicle. The method can include acquiring, using one or more sensors, sensor data of at least a portion of the external environment of the vehicle. The method can include detecting an external transmitter or an external transmission based on the acquired sensor data. The method can further include identifying the external transmitter or the external transmission based on the acquired sensor data. The method can also include detecting a shadow in the acquired sensor data. The method can include detecting a presence of an object in the external environment using at least in part the detected shadow.

In another respect, the subject matter presented herein relates to a system for detecting objects in an external environment of a vehicle. The system can include one or more sensors. The one or more sensors can be configured to acquire sensor data of at least a portion of an external environment of the vehicle. The system can include one or more processors operatively connected to the one or more sensors. The one or more processors can be configured to detect an external transmitter or an external transmission based on the acquired sensor data. The one or more processors can be configured to identify the external transmitter or an external transmission based on the acquired sensor data. The one or more processors can be configured to detect a shadow in the acquired sensor data. The one or more processors can be configured to detect a presence of an object in the external environment using at least in part the detected shadow.

In still another respect, the subject matter described herein relates to a computer program product for detecting objects in an external environment of a vehicle. The computer program product can include a non-transitory computer readable storage medium having program code embodied therein. The program code executable by a processor to perform a method. The method can include detecting an external transmitter or an external transmission based on sensor data of at least a portion of the external environment of the vehicle. The sensor data can be acquired by one or more sensors. The method can include identifying the external transmitter or an external transmission based on the acquired sensor data. The method can include detecting a shadow in the acquired sensor data. The method can include detecting a presence of an object in the external environment using at least in part the detected shadow.

DETAILED DESCRIPTION

Figure 1:
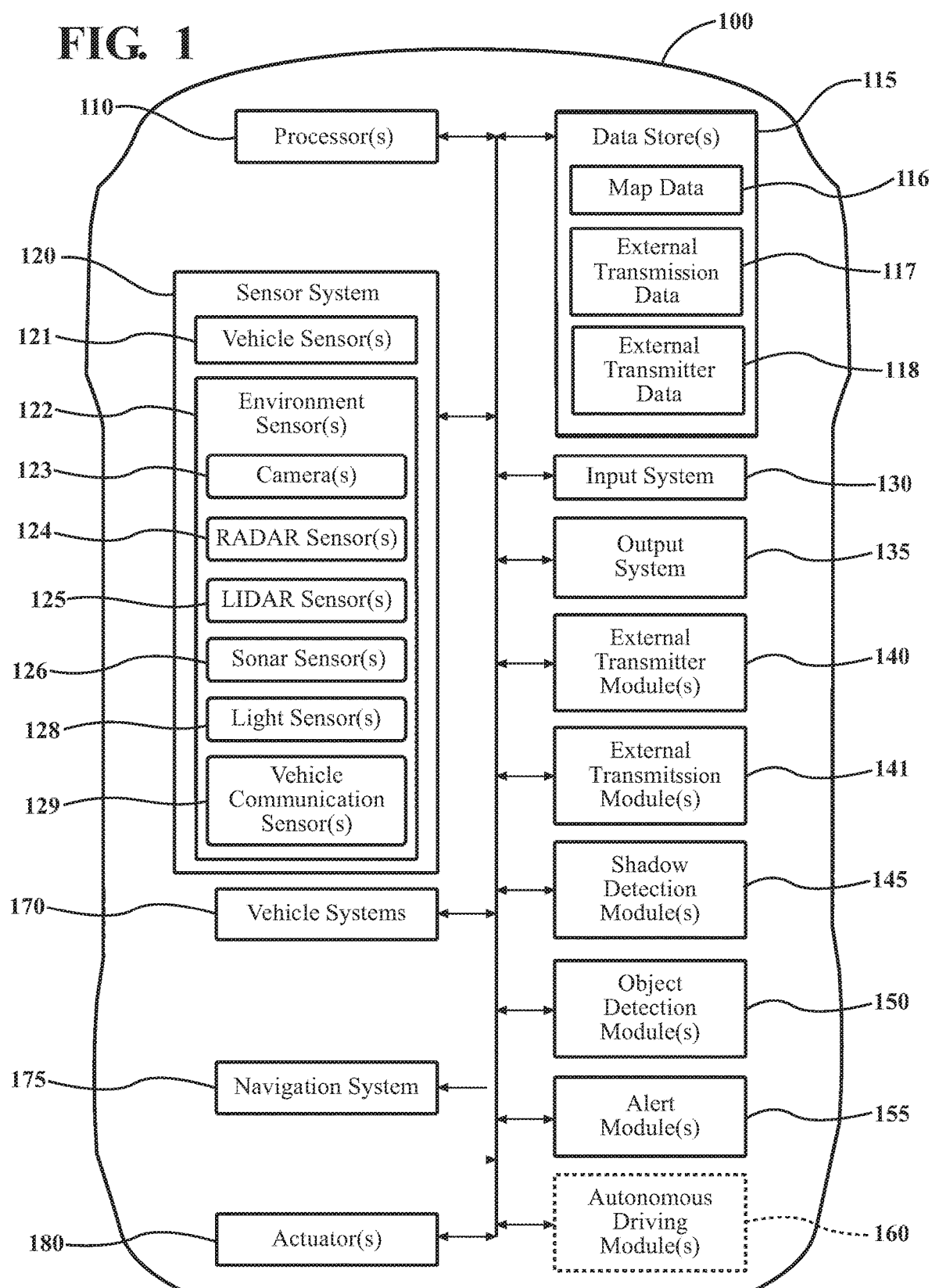
FIG. 1 is an example of a vehicle.

In some conditions, an object in the external environment may be effectively camouflaged to or otherwise difficult to detect by one or more sensors of a vehicle and/or a human driver. For instance, the object may be the same color as the background of the external environment. As another example, the object may be located far away. In such instances, it may be difficult for a human occupant and/or a vehicle computing system to detect the object.

Arrangements presented herein are directed to the detecting objects in the external environment of the vehicle. Sensor data of at least a portion of the external environment of the vehicle can be acquired using one or more sensors. Based the acquired sensor data, an external transmitter or an external transmission can be detected and a shadow can be detected. A "shadow" means a volume or area where signals are unable to reach due to an object blocking the signals. The shadow can be produced behind the blocking object relative to the location of a transmitter of the signals. The shadow can be defined by a three-dimensional volume behind the object relative to the location of the signal transmitter. The shadow can, alternatively or in addition, be defined by a two dimensional area (e.g., a silhouette) on a surface behind the object relative to the location of the signal transmitter. The shadow can be contrasted with adjacent space(s), area(s), and/or volume(s) in which signals or indicators of signals are present, visible, and/or detectable. As an example, when the external transmitter is a light source, the light source can cause an optical shadow to be cast by an object located between the external transmitter and the ground.

The detected external transmitter or an external transmission can be identified. The presence of an object in the external environment can be detected using at least in part the detected shadow. In some instances, the presence of the object can be detected and/or one or more characteristics of the object can be determined using one or more characteristics associated with the identified external transmitter or the identified external transmission. Arrangements described herein can enhance the quality of object detection, which, in turn, can provide a human driver or a vehicle computing system with information about the external environment of the vehicle to make informed decisions on how to maneuver the vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

In one or more arrangements, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with minimal or no input from a human driver. In one or more arrangements, the vehicle 100 can be highly automated or completely automated.

The vehicle 100 can have a plurality of autonomous and/or semi-autonomous operational modes. For instance, the vehicle 100 can have an unmonitored autonomous operational mode in which or more computing systems are used to navigate and/or maneuver the vehicle along a travel route with no input or supervision required from a human driver. The vehicle 100 can have a monitored autonomous operational mode in which one or more computing systems are used to navigate and/or maneuver the vehicle with at least some human driver supervision required. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. Examples of semi-autonomous operational modes include adaptive cruise control, lane keeping, and/or auto parking.

The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

The vehicle 100 can be configured to be switched between the various operational modes, including between any of the above-described operational modes. Such switching can be implemented in any suitable manner, now known or later developed. The switching can be performed automatically, selectively, or it can be done responsive to receiving a manual input or request.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements may be shown as being located on or within the vehicle 100 in FIG. 1, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, one or more processors 110 can be a main processor(s) of the vehicle 100. For instance, one or more processors 110 can be electronic control unit(s) (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, street lights, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, positions, coordinates, and/or information for one or more items included in the map data 116 and/or relative to other items included in the map data 116. The map data 116 can include a digital map with information about road geometry. In one or more arrangement, the map data 116 can include information about the ground, terrain, roads, surfaces, and/or other features of one or more geographic areas. The map data 116 can include elevation data in the one or more geographic areas. The map data 116 can define one or more ground surfaces, which can include paved roads, unpaved roads, land, and other things that define a ground surface. In some arrangements, the map data 116 can include street lights, including the position of the street lights. The map data 116 can be high quality and/or highly detailed.

The one or more data stores 115 can include external transmitter data 117. As used herein, an "external transmitter" is any component or group of components that can transmit signals. The external transmitter is not located on, in, or otherwise carried by a reference vehicle (e.g., the vehicle 100). The signals transmitted by the external transmitter can be electromagnetic signals, sonar signals, and/or other signals. When some of the transmitted signals impinge upon an object in the external environment of the transmitter, a shadow of the object can be cast. In one or more implementations, arrangements described herein can be directed to external transmitters that are light sources, which can cause an object to cast an optical shadow. Examples of such light sources include street lamps, street lights, building lights, security lights, signage lights, stadium lights, standalone lights, and/or lights from other vehicles. Alternatively or additionally, in one or more implementations, arrangements described herein can be directed to external transmitters that cause an object to cast other types of shadows, such as a lidar shadow, a radar shadow, a sonar shadow, and/or a vehicle communication signal shadow. Examples of such external transmitters include lidar sensor(s), radar sensor(s), sonar sensor(s), and/or vehicle communication system(s) carried by some other structure (e.g., other vehicles, a building, a bridge, an overpass, a road sign, a toll booth, etc.) in the external environment of the reference vehicle. These other structure(s) can be static structures and/or dynamic structures.

The external transmitter data 117 can include information about the external transmitters that the vehicle 100 may encounter in a driving environment. Such information can include characteristics of the signals transmitted by the external transmitters. As an example, the external transmitter can be an external light source. In such case, the external transmitter data 117 can include characteristics of the light energy or signals transmitted by the external light source. The characteristics include properties of the light energy itself, such as type of light, intensity, wavelength, frequency, light signature, and/or polarization, just to name a few possibilities. The characteristics can include properties of the signals transmitted by the external light source. Alternatively or additionally, the characteristics can include other attributes of the external light source. For example, such other attributes can include the height of the external light source, the location of the external light source, the angle(s) at which the external light source emits light energy or transmits signals, and/or the arrangement and/or distribution of signals transmitted.

The information about the external light sources can be specific to individual light sources. Alternatively or additionally, the information about the external light sources can be a range or an average for a particular type of light source, light sources located in a particular area, and/or light sources country-wide or region-wide. For instance, mercury vapor street lights are typically provided across the United States in a narrow range of heights. In the case of light sources carried by other vehicles (e.g., headlights, taillights, etc.), the information can be specific to a particular make, model, class, type, and/or manufacturer of a vehicle, or the information may be an average or range for a particular make, model, class, type, and/or manufacturer of a vehicle.

It should be noted that, while the above examples are directed instances in which the external transmitter is an external light source, the same or similar information can be included in the external transmitter data 117 for other external transmitters. For instance, the external transmitter data 117 can include information about other types of external transmitters (e.g., lidar, radar, electromagnetic, sonar, and/or vehicular communication) and characteristics of the signals transmitted by such external transmitters.

In one or more arrangements, the external transmitter data 117 can include external transmitter models. In some instances, the external transmitter models can include one or more images and/or other data of a plurality of different potential external transmitters or portions thereof. The external transmitter models can include one or more images and/or other data of one or more of the above examples of external transmitters. The images can be provided in any suitable format.

The images and/or other data may be of one or more portions of the exterior of at least a portion of a plurality of different transmitters. For instance, the images can be of at least a portion of a street light, a vehicle, and/or other light source. In some instances, the light source models can be of a full street light or a full vehicle, and may include different views. In some instances, the light source models can be of a partially occluded street light or vehicle. The light source models can include images or other data for a single vehicle or a plurality of different vehicles or for a single street light or a plurality of different street lights. The light source models can include measurements or other aspects of any light source included in the light source models.

The one or more data stores 115 can include external transmission data 118. As used herein, an "external transmission" is any signal or light energy in the external environment of a reference vehicle. The external transmission is not transmitted by a reference vehicle (e.g., the vehicle 100). The external transmission can include light energy, electromagnetic signals, sonar signals, and/or other signals, including any described herein.

The external transmission data 118 can include information about the external transmissions that the vehicle 100 may encounter in a driving environment. Such information can include characteristics of the external transmissions. As an example, the external transmission data 118 can include characteristics of the light energy or signals transmitted. The characteristics can include properties of the light energy itself, such as type of light, intensity, wavelength, frequency, light signature, and/or polarization, just to name a few possibilities. The characteristics can include properties, characteristics, and/or attributes of the source of such external transmissions (e.g., an external transmitter). For example, such other attributes can include the height of the external light source, the location of the external light source, the angle(s) at which the external light source emits light energy or transmits signals, and/or the arrangement and/or distribution of signals transmitted.

The information about the external transmissions can be specific to individual transmissions. Alternatively or additionally, the information about the external light sources can be a range or an average for a particular type of transmission, and which may be present in a particular area. For instance, mercury vapor street lights are typically provided across the United States, and such street lights have known light energy characteristics. In the case of light sources carried by other vehicles (e.g., headlights, taillights, etc.), the information can be specific to a particular make, model, class, type, and/or manufacturer of a vehicle, or the information may be an average or range for a particular make, model, class, type, and/or manufacturer of a vehicle.

It should be noted that, while the above examples are directed instances in which the external transmission is light energy, the same or similar information can be included in the external transmission data 118 for other external transmissions. For instance, the external transmission data 118 can include information about other types of external transmissions (e.g., lidar signals, radar signals, electromagnetic signals, sonar signals, and/or vehicular communication signals) and characteristics of the signals and/or information about the associated external transmitter that is the source of such signals. In one or more arrangements, the external transmission data 118 can include external transmission models. Thus, it will be appreciated that the identification of an external transmission can be used to infer the associated external transmitter, which may not be detectable in at least some instances.

In some instances, at least a portion of the map data 116 the external transmitter data 117, and/or the external transmission data 118 can be located in one or more data stores 115 located onboard the vehicle 100. Alternatively or in addition, at least a portion of the map data 116, the external transmitter data 117, and/or the external transmission data 118 can be located in one or more data stores 115 that are located remote from the vehicle 100, such as on a remote server communicatively linked to the vehicle 100 through one or more communication networks. The map data 116, the external transmitter data 117, and/or the external transmission data 118 can be obtained by the vehicle 100 from any suitable source, including a vehicle manufacturer or other entity and/or based on test data, just to name a few possibilities.

The data store(s) 115 can be communicatively linked to one or more elements of the vehicle 100 through one or more communication networks. As used herein, the term "communicatively linked" can include direct or indirect connections through a communication channel or pathway or another component or system. A "communication network" means one or more components designed to transmit and/or receive information from one source to another. The data store(s) 115 and/or one or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

As noted above, the vehicle 100 can include the sensor system 120. The sensor system 120 can include one or more sensors. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can detect, determine, assess, monitor, measure, quantify and/or sense information about the vehicle 100 itself (e.g., position, orientation, speed, etc.). Alternatively or in addition, the sensor system 120 can include one or more environment sensors 122 configured to detect, determine, assess, monitor, measure, quantify, acquire, and/or sense driving environment data. "Driving environment data" includes and data or information about the external environment in which a vehicle is located or one or more portions thereof. For example, the one or more environment sensors 122 can detect, determine, assess, monitor, measure, quantify, acquire, and/or sense obstacles in at least a portion of the external environment of the vehicle 100 and/or information/data about such obstacles. Such obstacles may be stationary objects and/or dynamic objects. The one or more environment sensors 122 can detect, determine, assess, monitor, measure, quantify, acquire, and/or sense other things in the external environment of the vehicle 100, such as, for example, lane markers, signs, traffic lights, traffic signs, lane lines, crosswalks, curbs proximate the vehicle 100, off-road objects, etc.

In one or more arrangements, the environment sensors 122 can include one or more cameras 123, one or more radar sensors 124, one or more lidar sensors 125, one or more sonar sensors 126, one or more ranging sensors, one or more light sensor(s) 128, and/or one or more vehicle communication sensors 129. Such sensors can be used to detect, determine, assess, monitor, measure, quantify, acquire, and/or sense, directly or indirectly, something about the external environment of the vehicle 100. For instance, one or more of the environment sensors 122 can be used to detect, determine, assess, monitor, measure, quantify, acquire, and/or sense, directly or indirectly, the presence of one or more obstacles in the external environment of the vehicle 100, the position or location of each detected obstacle relative to the vehicle 100, the distance between each detected obstacle and the vehicle 100 in one or more directions (e.g. in a longitudinal direction, a lateral direction, and/or other direction(s)), the elevation of each detected obstacle, the speed of each detected obstacle and/or the movement of each detected obstacle.

It should be noted that the environment sensors 122 can send outbound sensor signals into the external environment of the vehicle 100 and can receive return sensor signals, which may reflect off of obstacles located in the external environment. Differences between the outbound sensor signals and their corresponding return sensor signals, as well as other information, can be used for detection purposes in any suitable manner, now known or later developed. One or more of the environment sensors 122 can include a transmitter, a receiver, and/or a transceiver for transmitting and/or receiving signals.

The camera(s) 123 can be configured to capture visual data. "Visual data" includes video and/or image information/data. The camera(s) 123 can be high resolution cameras. The camera(s) 123 can capture visual data in any suitable wavelength of the electromagnetic spectrum.

The light sensor(s) 128 can be any component or group of components configured to receive light energy from light sources. In one or more arrangements, the light sensor(s) 128 can be one or more photovoltaic cells, panels, or arrays, or the light sensor(s) 128 can be a photodiode or a photodetector. In some arrangements, the light sensor(s) 128 can convert the received light energy into electrical signals.

The vehicle communication sensor(s) 129 can be any component or group of components configured to detect signals associated with the passing of information/data from a vehicle to an entity, and vice versa. For instance, the vehicle communication sensor(s) 129 can be configured to detect vehicle-to-everything (V2X) signals, vehicle-to-infrastructure (V2I) signals, vehicle-to-vehicle (V2V) signals, vehicle-to-pedestrian (V2P) signals, vehicle-to-device (V2D) signals, and/or vehicle-to-grid (V2G) signals. The vehicle communication signals can be any type of signal, now known or later developed. The vehicle communication signals can be any of those described above in connection with the communication networks. In one or more arrangements, the vehicle communication signals can be radio signals. In one or more arrangements, the vehicle communication signals can be part of the WLAN IEEE 802.11 family of standards. The vehicle communication signals may include identifiers that can help to identify the source of the vehicle communication signals. For instance, a particular aspect or signature of a vehicle communication signal may indicate a particular vehicle manufacturer and/or a particular make and/or model of vehicle.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

Returning to FIG. 1, the vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display. Alternatively or in addition, the output system 135 may include an earphone and/or speaker. Some components of the vehicle 100 may serve as both a component of the input system 130 and a component of the output system 135.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more external transmitter modules 140. The external transmitter module(s) 140 can be configured to analyze data/information acquired by the sensor system 120 (e.g., camera data, radar data, lidar data, sonar data, light sensor data, vehicle communication sensor data, etc.). The external transmitter module(s) 140 can detect one or more external transmitters in the external environment of the vehicle 100 based on the acquired sensor data (e.g., driving environment data). An external transmitter may be detected by detecting a physical structure (e.g., a street light), light energy (e.g., emitted by a street light), signals (e.g., radar, lidar, electromagnetic, sonar, and/or vehicle communication signals from a source outside the vehicle 100), and/or the presence of shadows. The external transmitter module(s) 140 can detect the external transmitter(s) using any suitable technique, including, for example, template matching and other kinds of computer vision and/or image processing techniques and/or other artificial or computational intelligence algorithms or machine learning methods.

The external transmitter module(s) 140 can be configured to identify the external transmitter based on the acquired sensor data. The external transmitter module(s) 140 can include and/or have access to the external transmitter data 117. The external transmitter module(s) 140 can also include any suitable software for transmitter recognition. The external transmitter module(s) 140 can compare acquired sensor data to one or more external transmitter models to identify the external transmitter. In one or more arrangements, a single type of sensor data (e.g., LIDAR sensor data only, RADAR sensor data only, camera sensor data only, light sensor data only, vehicle communication sensor data only, etc.) can be used for the comparison. Alternatively, in one or more arrangements, a plurality of different types of sensor data (e.g., multi-modality sensor data) can be used for the comparison.

The external transmitter module(s) 140 can query, analyze, search, and/or review the external transmitter models for possible matches with the acquired sensor data. In one example, acquired camera data for an external transmitter candidate can be compared to image data in the external transmitter models and/or the external transmitter data 117 for possible matches. In another example, acquired radar sensor data, lidar sensor data, sonar sensor data, light sensor data, vehicle communication sensor data, and/or other environment sensor data can be compared to the external transmitter models and/or the external transmitter data 117 for possible matches. Alternatively or in addition, measurements or other aspects of sensor data captured by the sensor system 120 can be compared to measurements or other aspects of the external transmitter models or external transmitter data 117. The external transmitter module(s) 140 can identify the detected external transmitter as a particular type of transmitter if there is a match between the sensor data an external transmitter as defined by an external transmitter model or the external transmitter data 117.

In this context, "match" or "matches" means that sensor data collected by the sensor system 120 and one or more of the external transmitter models and/or the external transmitter data 117 are substantially identical. For instance, the sensor data for a detected external transmitter and one or more of the external transmitter models or the external transmitter data 117 can match within a predetermined probability (e.g., at least about 85%, at least about 90%, at least about 95% or greater) or confidence level.

In instances in which there is no match between the detected external transmitter and the external transmitter models and/or the external transmitter data 117, the external transmitter module(s) 140 can be configured to predict the nature of the transmitter to the closest match with respect to the external transmitter models and/or the external transmitter data 117 or any other suitable technique.

In some instances, the external transmitter module(s) 140 can query, analyze, search, and/or review the map data 116, alone or in combination with the acquired sensor data. In one example, the external transmitter module(s) 140 may determine, using at least in part the map data 116, that a particular external transmitter is located at or near the current location of the vehicle 100. Thus, if an optical shadow or light energy emitted from a street light is detected, the external transmitter module(s) 140 can analyze the map data 116 to obtain information about a street light (e.g., location, height, light angles, etc.) located at or near the current location of the vehicle 100.

The vehicle 100 can include one or more external transmission modules 141. The external transmission module(s) 141 can be configured to analyze data/information acquired by the sensor system 120 (e.g., camera data, radar data, lidar data, sonar data, light sensor data, vehicle communication sensor data, light energy sensors, signal sensors, etc.). The external transmission module(s) 141 can be configured to detect one or more external transmissions in the external environment of the vehicle 100 based on the acquired sensor data (e.g., driving environment data). An external transmission may be detected by detecting light energy (e.g., emitted by a street light) and/or signals (e.g., radar, lidar, electromagnetic, sonar, and/or vehicle communication signals from a source outside the vehicle 100) capable of forming a shadow of an object in the external environment. The external transmission module(s) 141 can be configured to detect such light energy and/or signals even if the source (e.g., an external transmitter) is not detected. The external transmission module(s) 141 can detect the external transmission(s) using any suitable technique, including, for example, signal analysis, template matching and other kinds of computer vision and/or image processing techniques and/or other artificial or computational intelligence algorithms or machine learning methods.

The external transmission module(s) 141 can be configured to identify the external transmission. The external transmission module(s) 141 can include and/or have access to the external transmission data 118. The external transmission module(s) 141 can also include any suitable software for external transmission recognition. In one or more arrangements, the external transmission module(s) 141 can compare acquired sensor data to one or more external transmission models to identify the external transmission.

The external transmission module(s) 141 can query, analyze, search, and/or review the external transmission data 118 for possible matches with the acquired sensor data. In one example, an external transmission model can be compared to the acquired external transmission for possible matches. Alternatively or in addition, measurements or other aspects of the external transmission captured by the sensor system 120 can be compared to measurements or other aspects of the external transmission data 118. The external transmission module(s) 141 can identify the detected external transmission as a particular type of transmission if there is a match between the detected external transmission and the external transmission data 118.

In instances in which there is no match between the detected external transmission and the external transmission models and/or the external transmission data 118, the external transmission module(s) 141 can be configured to predict the nature of the transmission to the closest match with respect to the external transmission models and/or the external transmission data 118 or any other suitable technique.

In some instances, the external transmission module(s) 141 can be configured to query, analyze, search, and/or review the map data 116, the external transmitter data 117, the external transmission data 118, and/or the acquired sensor data. In one example, the external transmission module(s) 141 may determine, using at least in part the map data 116, that a particular external transmitter is located at or near the current location of the vehicle 100. Thus, if light energy is detected, the external transmission module(s) 141 can analyze the map data 116 the external transmitter data 117, and/or the external transmission data 118 to obtain information about nearby street light (e.g., location, height, light angles, etc.) located at or near the current location of the vehicle 100.

The vehicle 100 can include one or more shadow detection modules 145. The shadow detection module(s) 145 can be configured to analyze data/information acquired by the sensor system 120 (e.g., camera data, radar sensor data, lidar sensor data, sonar sensor data, light sensor data, vehicle communication sensor data, etc.). The shadow detection module(s) 145 can detect one or more shadows in the external environment of the vehicle 100 based on the acquired sensor data. The shadow detection module(s) 145 can detect the shadow(s) using any suitable technique, including, for example, template matching and other kinds of computer vision and/or image processing techniques and/or other artificial or computational intelligence algorithms or machine learning methods. The shadow detection module(s) 145 can be configured to measure one or more dimensions of the shadow (e.g., length, width, etc.). The shadow may be an optical shadow, which may or may not be visible to the human sense of sight. The shadow detection module(s) 145 can be configured to detect variations in colors, shades, hue, etc. of areas on a surface, such as a road or the ground, which can indicate potential shadow candidates. The shadow may be a radar shadow, lidar shadow, a sonar shadow, or a vehicle communication signal shadow. The shadow detection module(s) 145 can be configured to detect the presence of, absence of, and/or variations in signals in a volume, areas, or on a surface, which can indicate potential shadow candidates.

The shadow detection module(s) 145 can be configured to detect, measure, and/or track changes in the shape of a shadow over time. In some instances, the shadow detection module(s) 145 can be configured to detect changes in the shadow (e.g., changes in size, shape, orientation, etc.). If the shadow changes as the vehicle 100 is moving, then it can, in at least some instances, be determined to be a shadow as opposed to a dark spot on the ground.

Similarly, if a shadow changes (size, shape, orientation, etc.) as the external transmitter moves, then the vehicle 100 can, in at least some instances, determine that the shadow is actually a shadow. As an example, the headlights of another vehicle from a cross traffic direction relative to the vehicle 100 can cause an object to cast an optical shadow. The vehicle 100 can initially detect this shadow. However, if the shadow changes as the cross direction vehicle moves, then it can be determined to be a shadow, as opposed to something else (e.g., a dark spot on the ground). Moreover, it will be appreciated that the detection of the presence of an object in the external environment can be facilitated by detecting changes in the shape of a shadow responsive to a movement of the vehicle or a movement of the external transmitter.

The shadow detection module(s) 145 can be configured to detect, measure, and/or track a plurality of shadows associated with the same area of the external environment. In this respect, "associated with the same area of the external environment" includes a plurality of shadows that at least partially overlap each other, that emanate from or near the same area, and/or that terminate at or near the same area. The plurality of shadows may be due to the presence of a plurality of external transmitters being located in a given area. For instance, an object in the external environment may simultaneously cast an optical shadow due to light energy from a street lamp as well as a radar shadow from radar signals transmitted by a cross traffic vehicle. In some instances, plurality of shadows may be due to one or more external transmitters being located in a given area as well as to one or more transmitters associated with the vehicle 100. For example, the object may cast a shadow due to light energy (e.g., from one or more tail lights) and/or signals (e.g., radar, lidar, sonar, vehicle communication signals, etc.) from the vehicle 100 itself. When an object casts a plurality of shadows, the vehicle 100 can detect the presence of an object and/or characteristics of the object with a greater degree of confidence.

The vehicle 100 can include one or more object detection modules 150. The object detection module(s) 150 can be configured to detect the presence of an object in the external environment. The object itself may not be directly detectable. The object detection module(s) 150 can detect the presence of an object in any suitable manner. In one or more arrangements, the detection can be performed using at least a detected shadow of the object. For instance, the detection can be performed by detecting changes in the orientation, shape, and/or size of the shadow as the vehicle 100 moves.

In addition, the object detection module(s) 150 can detect the presence of an object by also using one or more characteristics associated with the identified external transmitter and/or the detected shadow. For instance, the object detection module(s) 150 can use the distance between the vehicle 100 and the external transmitter, as determined by, for example, lidar, radar, vehicle communication, sonar, camera data, GPS data, position data, location data, and/or map data 116. The object detection module(s) 150 can use a determined height of the identified external transmitter and/or an angle at which signals are emitted from the external transmitter relative to the ground or to horizontal. The object detection module(s) 150 can use a measured length of the shadow or other dimension of the shadow.

In addition to detecting the presence of an object, the object detection module(s) 150 can be configured to determine one or more characteristics of the detected object. Such a determination can also be based on at least in part one or more characteristics associated with the identified external transmitter, the external transmission, and/or the detected shadow. In one or more arrangements, the one or more characteristics of the detected object can include one or more dimensions of the object (e.g., length, width, height). In one or more arrangements, the one or more characteristics of the detected object can include a distance between the object and the vehicle 100. These characteristics can be calculated in any suitable manner. For example, in one implementation with reference to FIG. 5, a height of an object 500 can be determined according to the following formula: h=tan(a)×L, where h is the height of the object 500, a is the angle of the transmitter 502 (e.g. an imaginary line 504 from the transmitter 502 to the end 508 of the shadow 510) relative to horizontal or the ground 506, and L is the length of the shadow 510 cast by the object 500 (or as much of the length of the shadow 510 that is detectable by the vehicle 100). In one or more arrangements, the one or more characteristics of the detected object can include a classification of the size of an object (e.g., large or small). In some instances, the object detection module(s) 150 can be configured to predict the nature of the detected object based on the size and/or shape of the shadow.

As another example, an external transmitter (e.g., a lamp) may be blocked by a wall or other structure, but it may still be able to illuminate an extra brick laying on top of a brick road. The object detection module(s) 150 may not be able to directly detect the lamp because it is behind the wall. Further, the vehicle 100 may not be able to detect the extra brick because it blends in with the brick road. However, the vehicle 100 can detect the shadow of the extra brick as well as the light energy from the lamp. The object detection module(s) 150 can use acquired sensor data about the shadow as well as the map data 116, the external transmitter data 117, and/or the external transmission data 118 to infer information about the external transmission and/or the external transmitter and, ultimately, to detect the presence of the extra brick.

The vehicle 100 can include one or more alert modules 165. The alert module(s) 165 can cause an alert, message, warning, and/or notification to be presented within the vehicle 100. The alert module(s) 165 can cause any suitable type of alert, message, warning, and/or notification to be presented, including, for example, visual, audial, and/or haptic alert, just to name a few possibilities. The alert module(s) 165 can be operatively connected to the output system 135, one or more vehicle systems 170, and/or components thereof to cause the alert to be presented.

In one or more arrangements, the alert module(s) 165 can cause a visual warning to be presented. "Visual warning" is any output that provides an alert or warning in a manner that is perceptible to the human sense of sight. The visual warning can be presented by one or more components of the output system 135, such as on one or more displays or one or more lights. The visual warning can have any suitable form. In one or more arrangements, the visual warning can include one or more words, one or more phrases, one or more symbols, one or more pictures, and/or one or more messages.

In one or more arrangements, the alert module(s) 165 can cause an audial warning to be presented. "Audial warning" is any output that provides an alert or warning in a manner that is perceptible to the human sense of hearing. The audial warning can be presented by one or more components of the output system 135, such as by being emitted over one or more speakers. The audial warning can have any suitable form. The audial warning can include one or more sounds, one or more words, one or more phrases, and/or one or more messages.

The vehicle 100 can include one or more autonomous driving modules 160. The autonomous driving module(s) 160 can receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can receive, capture, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can execute various vehicle functions and/or to transmit data to, receive data from, interact with, and/or control the vehicle 100 or one or more systems thereof (e.g. one or more of vehicle systems 170).

The vehicle 100 can include one or more vehicle systems 170. The one or more vehicle systems 170 can include a propulsion system, a braking system, a steering system, throttle system, a transmission system, a signaling system, and/or a navigation system 175. Each of these systems can include one or more mechanisms, devices, elements, components, systems, and/or combination thereof, now known or later developed. The above examples of the vehicle systems 170 are non-limiting. Indeed, it will be understood that the vehicle systems 170 can include more, fewer, or different vehicle systems. It should be appreciated that although particular vehicle systems are separately defined, each or any of the systems or portions thereof may be otherwise combined or segregated via hardware and/or software within the vehicle 100.

The navigation system 175 can include one or more mechanisms, devices, elements, components, systems, applications and/or combinations thereof, now known or later developed, configured to determine the geographic location of the vehicle 100 and/or to determine a travel route for the vehicle 100. The navigation system 175 can include one or more mapping applications to determine a travel route for the vehicle 100. The navigation system 175 can include a global positioning system, a local positioning system, or a geolocation system.

In one or more arrangements, the navigation system 175 can include a global positioning system, a local positioning system or a geolocation system. The navigation system 175 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 175 can use Transmission Control Protocol (TCP) and/or a Geographic information system (GIS) and location services.

The navigation system 175 may include a transceiver configured to estimate a position of the vehicle 100 with respect to the Earth. For example, navigation system 175 can include a GPS transceiver to determine the vehicle's latitude, longitude and/or altitude. The navigation system 175 can use other systems (e.g. laser-based localization systems, inertial-aided GPS, and/or camera-based localization) to determine the location of the vehicle 100.

The processor(s) 110 and/or the autonomous driving module(s) 160 can be operatively connected to communicate with the various vehicle systems 170 and/or individual components thereof. For example, returning to FIG. 1, the processor(s) 110 and/or the autonomous driving module(s) 160 can be in communication to send and/or receive information from the various vehicle systems 170 to control the movement, speed, maneuvering, heading, direction, etc. of the vehicle 100. The processor(s) 110 and/or the autonomous driving module(s) 160 may control some or all of these vehicle systems 170 and, thus, may be partially or fully autonomous.

For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 180 to modify, adjust and/or alter one or more of the vehicle systems 170 or components thereof to responsive to receiving signals or other inputs from the processor(s) 110 and/or the autonomous driving module(s) 160. The one or more actuators 180 can include motors, pneumatic actuators, hydraulic pistons, relays, solenoids, and/or piezoelectric actuators, just to name a few possibilities.

Now that the various potential systems, devices, elements and/or components of the vehicle 100 have been described, various methods will now be described. Various possible steps of such methods will now be described. The methods described may be applicable to the arrangements described above in relation to FIG. 1, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 2:
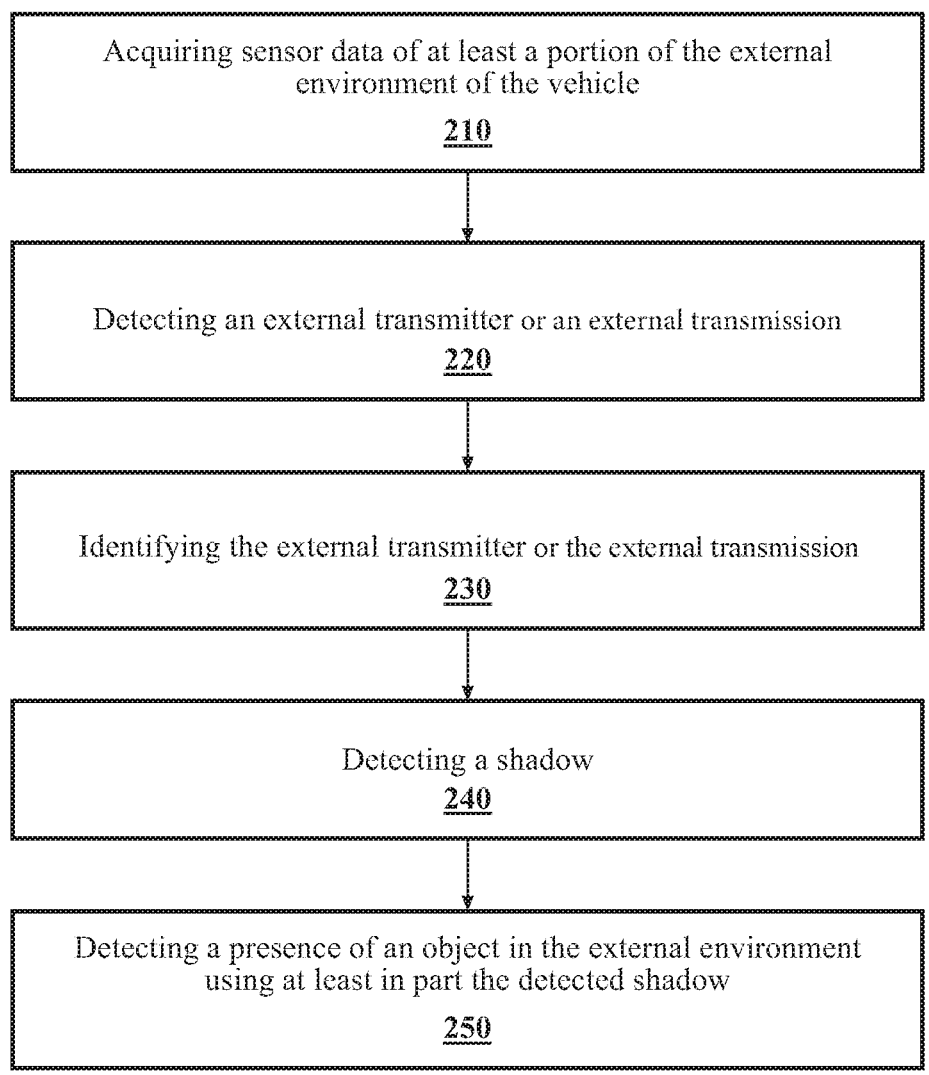
FIG. 2 is an example of a method of object detection using shadows.

Referring now to FIG. 2, an example of a method 200 of detecting objects in an external environment of the vehicle 100 is shown. At block 210, sensor data of at least a portion of the external environment of the vehicle 100 can be acquired by one or more sensors. In some instances, the one or more sensors can be located onboard the vehicle 100. In some instances, one or more of the sensors may not be located on, in, or otherwise carried by the vehicle 100. Such acquiring can be performed by one or more of the environment sensors 122. As an example, the camera(s) 123, the radar sensor(s) 124, the lidar sensor(s) 125, the sonar sensor(s) 126, the light sensor(s) 128, the vehicle communication sensor(s) 129, or any combination thereof can be used to acquire sensor data. The method 200 can continue to block 220.

At block 220, an external transmitter and/or an external transmission can be detected based on the acquired sensor data. For instance, the acquired sensor data can be analyzed by the sensor system 120, the processor(s) 110, the external transmitter module(s) 140, the external transmission module(s) 141, and/or one or more modules(s) to detect an external transmitter or an external transmission in the external environment. The method 200 can continue to block 230.

At block 230, the external transmitter and/or the external transmission can be identified based on the acquired sensor data. For instance, the acquired sensor data can be analyzed by the sensor system 120, the processor(s) 110, the external transmitter module(s) 140, the external transmission module(s) 141, and/or one or more other modules(s) to identify the detected external transmitter and/or the external transmission. For instance, the acquired sensor data can be compared and/or analyzed relative to the external transmitter data 117 and/or the external transmission data 118. The method 200 can continue to block 240.

At block 240, a shadow can be detected in the acquired sensor data. For instance, the acquired sensor data can be analyzed by the sensor system 120, the processor(s) 110, the shadow detection module(s) 145, and/or one or more other modules(s) to detect a shadow in the external environment. The shadow may or may not be perceptible to the human sense of sight. The method 200 can continue to block 250.

At block 250, a presence of an object in the external environment can be detected using at least in part a characteristic associated with the identified external transmitter and the detected shadow. For instance, the processor(s) 110, the object detection module(s) 150, and/or other module(s) can analyze the detected shadow relative to known or predicted information about the identified external transmitter. Such analysis can detect the presence of an object in the external environment. Such analysis can also detect one or more characteristics of the object.

The method 200 can end. Alternatively, the method 200 can return to block 210 or some other block.

When an object has been detected, there are various things that can be done. As an example, in some instances, the vehicle 100 can be an autonomous vehicle or a semi-autonomous vehicle. In such cases, the method 200 can include determining a driving maneuver for the vehicle 100 based at least partially on the object. For instance, the driving maneuver may be reducing the speed of the vehicle 100 to a reduced speed until the object no longer poses a collision risk. As another example, the driving maneuver can be a steering of the vehicle 100 in one or more directions to avoid a collision with the object. The driving maneuver can be determined by the processor(s) 110 and/or the autonomous driving module(s) 160. The vehicle 100 can be caused to implement the determined driving maneuver. The vehicle 100 can be caused to implement the determined driving maneuver in any suitable manner. In one or more arrangements, the processor(s) 110 and/or the autonomous driving module(s) 160 can cause the vehicle 100 to implement the driving maneuver. The processor(s) 110 and/or the autonomous driving module(s) 160 can be operatively connected to one or more of the vehicle systems 170 to implement the determined driving maneuver. In one or more arrangements, the processor(s) 110 and/or the autonomous driving module(s) 160 can be operable to control the one or more actuators 180, which can control one or more of the vehicle systems 170 or portions thereof to implement the determined driving maneuver.

In some instances, an alert can be presented within the vehicle 100 when an object is detected as described above. The alert can be any type of alert. By providing an alert, a vehicle occupant can be alerted of the presence of the object, which the vehicle occupant may or may not be able to see.

In some instances, the vehicle 100 can communicate the detection of the object with other devices in the external environment, such as other vehicles and/or infrastructure. Vehicle-to-vehicle (V2V) and vehicle-to-infrastructure (V2I) communications can be transmitted according to any suitable wireless communication media, standards, and protocols, now known or later developed. In certain systems, the vehicle 100, the other vehicles, and the infrastructure may include specialized hardware to enable such communications, while in other examples the communication systems can be implemented using existing vehicle hardware components (e.g., radio and satellite equipment, navigation computers). Infrastructure can include non-vehicle receiving devices, for example, toll booths, rail road crossings, and road-side devices. Certain V2V and V2I communication systems may continuously broadcast vehicle operational information from a surrounding vehicle or from any infrastructure device capable of transmitting the information to a vehicle.

Figure 3:
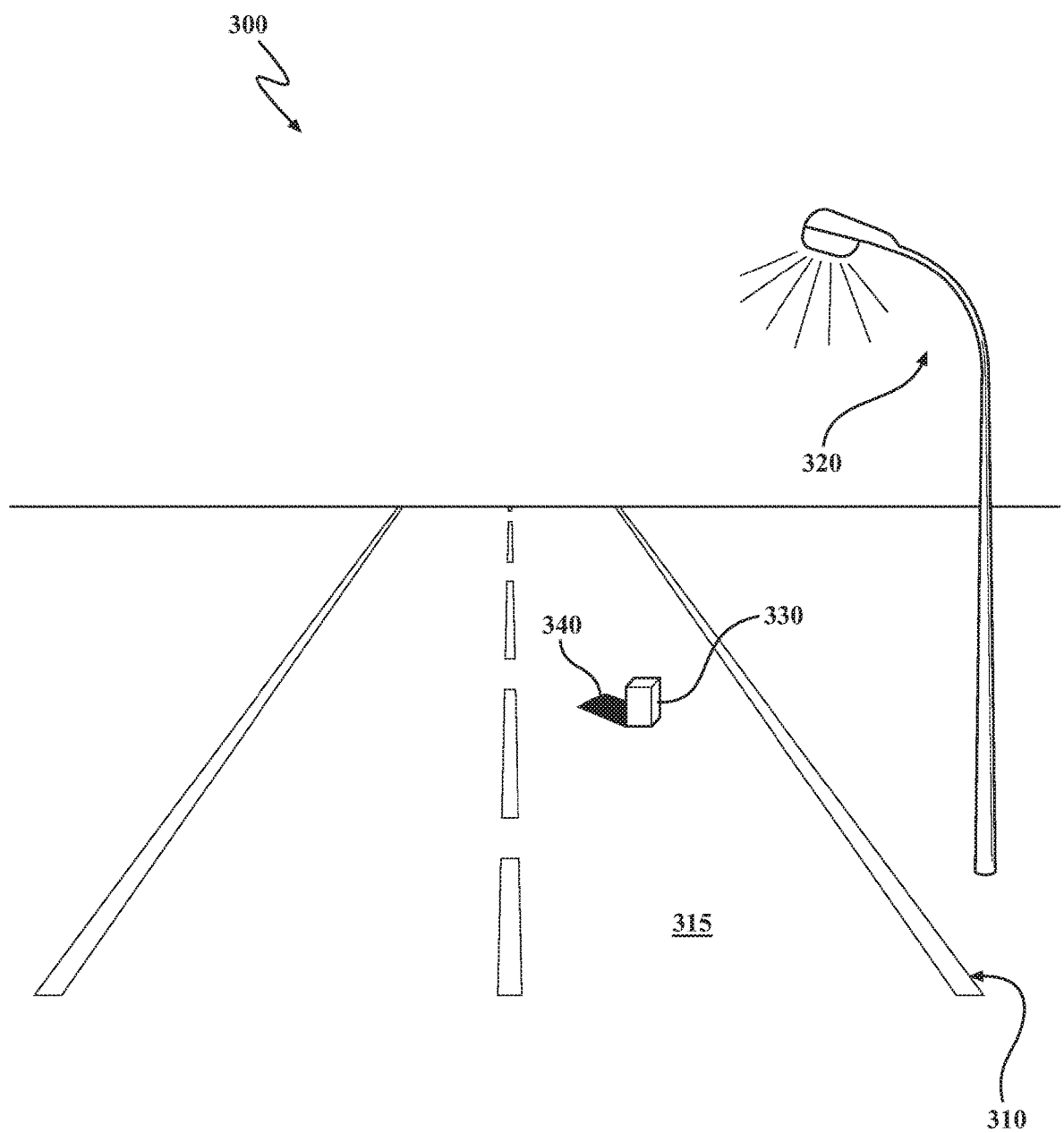
FIG. 3 is an example of a driving scenario in which an object is detected based in part on an optical shadow of the object.

A non-limiting example of the operation of the vehicle 100 and/or the method 200 will now be described in relation to FIG. 3. Referring to FIG. 3, the vehicle 100 can be traveling in an environment 300. For instance, the vehicle 100 may be traveling a road 310 in a travel lane 315. There can be one or more external transmitters (e.g., street lights 320) distributed along the road 310. For this example, it is nighttime, and the street light 320 is activated. There can be an object 330 located in the travel lane 315 of the road 310. Due to the light from the street light 320, the object 330 can cast a shadow 340 in the road 310.

The vehicle 100 can use one or more sensors of the sensor system 120 to acquire sensor data of at least a portion of the environment 300, particularly in a portion of the environment 300 that is located forward of the vehicle 100 in the travel direction of the vehicle 100. For instance, the vehicle 100 can acquire visual data using one or more cameras 123. The acquired visual data can be analyzed by the vehicle 100. The street light 320 and/or the light energy emitted by the street light 320 can be detected within the acquired visual data.

The vehicle 100 can identify the source of the light as being a street light. The vehicle 100 can do so by comparing the acquired visual data to the external transmitter data 117. For instance, the vehicle can compare the acquired visual data to various street light models in the external transmitter data 117. If the acquired visual data substantially matches one of the street light models, then the street light 320 can be considered to be identified. Alternatively, the street light 320 can be identified based on one or more characteristics of the light energy emitted by the street light 320. For instance, the vehicle can compare the acquired light energy to various external transmission models in the external transmission data 118. If the acquired light energy substantially matches one of the external transmission models or the external transmission data 118, then the external transmission can be considered to be identified.

Regardless of how the street light 320 is identified, the vehicle 100 can obtain information one or more characteristics of the identified street light, such as in the external transmitter data 117 and/or the external transmission data 118. Such information may include the height of the street light 320, the position of the street light 320, and/or one or more characteristics of the light energy output by the street light 320.

The vehicle 100 can detect the shadow 340 of the object 330 based on the acquired visual data. It should be noted that the object 330 may or may not be included in the visual data. In some instances, the object 330 may be included in the acquired visual data, but it is obscured or otherwise camouflaged with the rest of the external environment. The vehicle 100 may be able to detect one or more aspects about the shadow 340, such as changes in size, shape, and/or position. Alternatively or in addition, the vehicle 100 may be able to detect one or more dimensions of the shadow, such as the length and/or width of the shadow 340.

The vehicle 100 can detect the presence of the object 330 using at least in part one or more characteristics associated with the identified street light 320 and the detected shadow 340.

In one or more arrangements, the vehicle can cause an alert to be presented within the vehicle 100. Such an alert can warn the vehicle driver as to the presence of the object 330. In one or more arrangements, when the vehicle 100 is an autonomous vehicle, the vehicle 100 can determine a driving maneuver relative to the object 330. For instance, the vehicle 100 can determine one or more steering and/or braking maneuvers to avoid a collision with the object 330.

Figure 4:
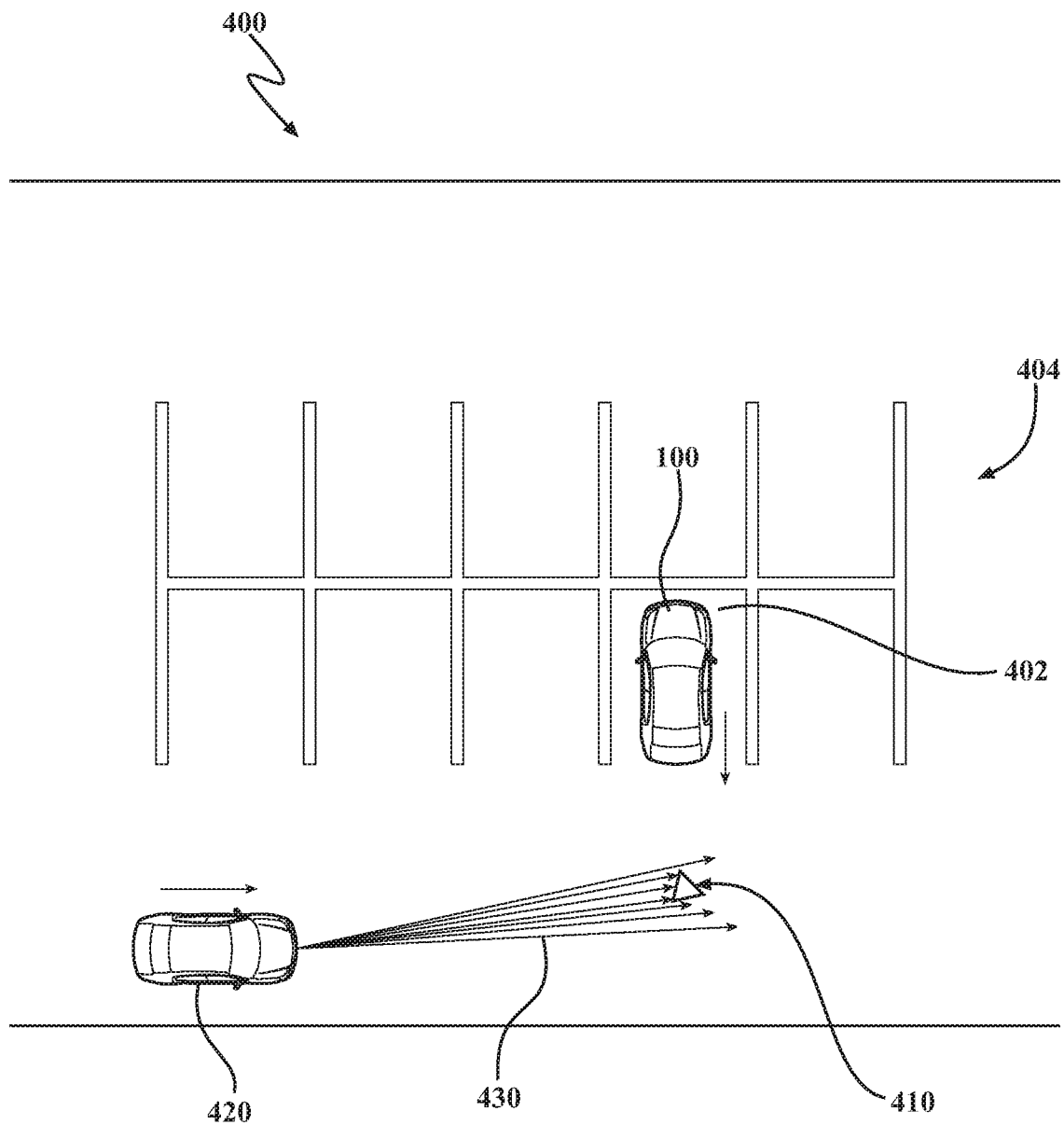
FIG. 4 is an example of a driving scenario in which an object is detected based in part on a radar shadow of the object.
Figure 5:
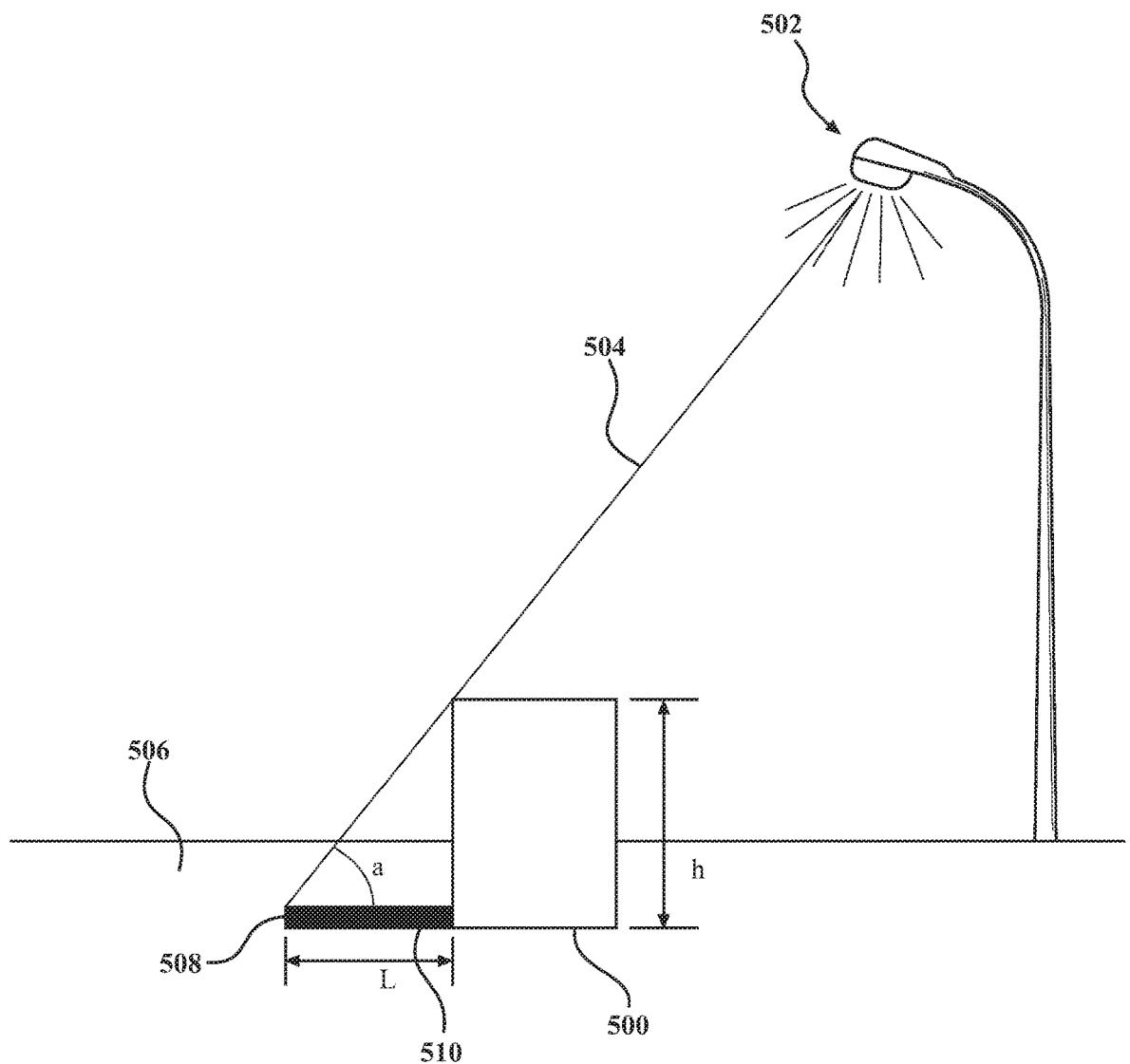
FIG. 5 shows one example of determining a dimension of an object using at least in part a shadow of the object.

Another non-limiting example of the operation of the vehicle 100 and/or the method 200 will now be described in relation to FIG. 4. Referring to FIG. 4, the vehicle 100 is located in an environment 400. The vehicle 100 may be in an environment parked in a parking space 402 of a parking lot 404. The vehicle 100 may be in the process of reversing out of the parking spot to leave the parking lot. There can be an object 410 located in the reverse path of the vehicle 100. The vehicle 100 may have a backup camera. However, for some reason, the object 410 is obscured to the vehicle 100. Also, it may be difficult for the human driver of the vehicle to see the object 410.

Another vehicle 420 may be traveling in the parking lot in a direction that intersects with the reverse path of the vehicle 100. The other vehicle 420 may have an external transmitter, such as a radar based object detection system. The other vehicle 420 can transmit radar signals 430 into the external environment. Some of the radar signals will impinge upon the object 410. Some of these signals will be reflected back to the other vehicle 420, and some of these radar signals will be reflected in a different direction. Further some of the radar signals will not impinge upon the object 410 and travel beyond their working range or impinge upon a different structure, such as the ground.

Some of these radar signals can be acquired by the sensor system 120 of the vehicle 100 as it acquires sensor data of the external environment. In this case, the vehicle 100 can determine that there is an external transmission and/or an external transmitter in the external environment of the vehicle 100. In particular, the vehicle 100 can detect the presence of radar signals that it did not transmit. The vehicle 100 can determine that these radar signals are from an external transmitter on another vehicle. The vehicle 100 may also be able to identify the particular radar signals and/or the particular vehicle that the radar signals came from. The vehicle 100 can use the external transmitter data 117 and/or the external transmission data 118 to determine associated characteristics of the radar signals, such as the number of signals emitted, the angle of the different signals, the location on the other vehicle 420 from which the signals are transmitted. The vehicle 100 can detect a radar shadow of the object 410.

The vehicle 100 can detect the presence of the object in the external environment using at least in part a characteristic associated with the identified external transmitter and the detected shadow. In addition, the vehicle 100 may be able to determine one or more characteristics of the object 410, such as the height of the object 410.

In one or more arrangements, the vehicle can cause an alert to be presented within the vehicle 100. Such an alert can warn the vehicle driver as to the presence of the object 410. In one or more arrangements, the vehicle 100 can determine a driving maneuver relative to the object 410. For instance, when the vehicle 100 is an autonomous vehicle, the vehicle 100 can determine a travel path while it is reversing out of the parking spot to avoid a collision with the object 410.

It will be appreciated that arrangements described herein can provide numerous benefits, including one or more of the benefits mentioned herein. For example, arrangements described herein can result in enhanced object detection in the external environment of the vehicle. Arrangements described herein can improve the detection of objects that may be camouflaged other otherwise hidden or difficult for vehicle sensors and/or to a human driver to detect. Arrangements described herein can detect the presence of an object and/or characteristics of an object without having to directly detect the object. Arrangements described herein can indirectly detect the presence of an object and/or characteristics of an object using shadows and/or information about an external transmitter that is causing the object to cast a shadow. When arrangements described herein are used in connection with an autonomous vehicle and/or a semi-autonomous vehicle, the performance and/or safe operation of the vehicle can be facilitated. Arrangements described herein can provide human drivers with important information about the external environment.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of detecting objects in an external environment of a vehicle, the method comprising:
   acquiring, using one or more sensors, sensor data of at least a portion of the external environment of the vehicle;
   detecting an external transmitter or an external transmission based on the acquired sensor data;
   identifying the external transmitter or the external transmission based on the acquired sensor data;
   detecting a shadow based on the acquired sensor data, the shadow being a volume or an area where signals from the external transmitter are unable to reach due to an object blocking the signals; and
   detecting a presence of an object in the external environment using at least in part the detected shadow.

2. The method of claim 1, further including determining one or more characteristics of the object based on at least in part a characteristic associated with the identified external transmitter or the identified external transmission and the detected shadow.

3. The method of claim 2, wherein the one or more characteristics of the object includes one or more dimensions of the object.

4. The method of claim 2, wherein the one or more characteristics of the object includes a distance between the object and the vehicle.

5. The method of claim 1, wherein the acquired sensor data includes light energy, and wherein detecting the external transmitter or the external transmission based on the acquired sensor data includes detecting the external transmitter or the external transmission based on the light energy acquired by the one or more sensors.

6. The method of claim 1, wherein the acquired sensor data includes visual data, and wherein detecting the external transmitter or the external transmission based on the acquired sensor data includes detecting the external transmitter or the external transmission based on the visual data acquired by the one or more sensors.

7. The method of claim 1, wherein the shadow is an optical shadow.

8. The method of claim 1, wherein the shadow is one of a radar shadow, a lidar shadow, or a sonar shadow.

9. The method of claim 1, wherein the shadow is one of a vehicle communication signal shadow.

10. The method of claim 1, wherein the vehicle is an autonomous vehicle or a semi-autonomous vehicle, the method further including:
determining a driving maneuver for the vehicle based at least partially on the object; and
causing the vehicle to implement the determined driving maneuver.

11. The method of claim 1, further including causing an alert to be presented within the vehicle, whereby a vehicle occupant is alerted of the presence of the object.

12. The method of claim 1, wherein detecting the presence of the object in the external environment using at least in part the detected shadow is based at least in part on changes in a shape of the detected shadow responsive to a movement of the vehicle or a movement of the external transmitter.

13. The method of claim 1, wherein detecting the presence of the object in the external environment using at least in part the detected shadow is based at least in part on detecting a plurality of shadows associated with an area of the external environment.

14. A system for detecting objects in an external environment of a vehicle, the system comprising:
one or more sensors configured to acquire sensor data of at least a portion of the external environment of the vehicle; and
a processor operatively connected to the one or more sensors, the processor being configured to:
detect an external transmitter or an external transmission based on sensor data acquired by the one or more sensors;
identify the external transmitter or the external transmission based on the sensor data acquired by the one or more sensors;
detect a shadow based on the sensor data acquired by the one or more sensors, the shadow being a volume or an area where signals from the external transmitter are unable to reach due to an object blocking the signals; and
detect a presence of an object in the external environment using at least in part the detected shadow.

15. The system of claim 14, further including determining one or more characteristics of the object based on at least in part a characteristic associated with the identified external transmitter or the identified external transmission and the detected shadow.

16. The system of claim 15, wherein the one or more characteristics of the object includes:
one or more dimensions of the object; or
a distance between the object and the vehicle.

17. The system of claim 14, wherein the one or more sensors include one or more photovoltaic cells, photodiodes, or photodetectors, wherein the acquired sensor data includes light energy, and wherein detecting the external transmitter or the external transmission based on the sensor data acquired by the one or more sensors includes detecting the external transmitter or the external transmission based on the light energy acquired by the one or more sensors.

18. The system of claim 14, wherein the one or more sensors include one or more cameras, wherein the acquired sensor data includes visual data, and wherein detecting the external transmitter or the external transmission based on the sensor data acquired by the one or more sensors includes detecting the external transmitter or the external transmission based on the visual data acquired by the one or more cameras.

19. The system of claim 14, wherein the one or more sensors include one or more optical cameras, and wherein the shadow is an optical shadow.

20. The system of claim 14, wherein the one or more sensors include one or more radar sensors, one or more lidar sensors, or one or more sonar sensors.

21. The system of claim 14, wherein the one or more sensors include one or more vehicle communication signal sensors.

22. The system of claim 14, wherein the vehicle is an autonomous vehicle or a semi-autonomous vehicle, and wherein the processor is configured to:
determine a driving maneuver for the vehicle based at least partially on the object; and
cause the vehicle to implement the determined driving maneuver.

23. The system of claim 14, wherein the processor is configured to:
present an alert within the vehicle, whereby a vehicle occupant is alerted of the presence of the object.

24. The system of claim 14, wherein detecting the presence of the object in the external environment using at least in part the detected shadow is based at least in part on changes in a shape of the detected shadow responsive to movement of the vehicle or movement of the external transmitter.

25. The system of claim 14, wherein detecting the presence of the object in the external environment using at least in part the detected shadow is based at least in part on detecting a plurality of shadows associated with an area of the external environment.

26. A computer program product for detecting objects in an external environment of a vehicle, the computer program product comprising a non-transitory computer readable storage medium having program code embodied therewith, the program code executable by a processor to perform a method comprising:
detecting an external transmitter or an external transmission based on sensor data of at least a portion of the external environment of the vehicle, the sensor data acquired by one or more sensors;
identifying the external transmitter or the external transmission based on the acquired sensor data;
detecting a shadow based on the acquired sensor data, the shadow being a volume or an area where signals from the external transmitter are unable to reach due to an object blocking the signals; and
detecting a presence of an object in the external environment using at least in part the detected shadow.

* * * * *